Figure 1:
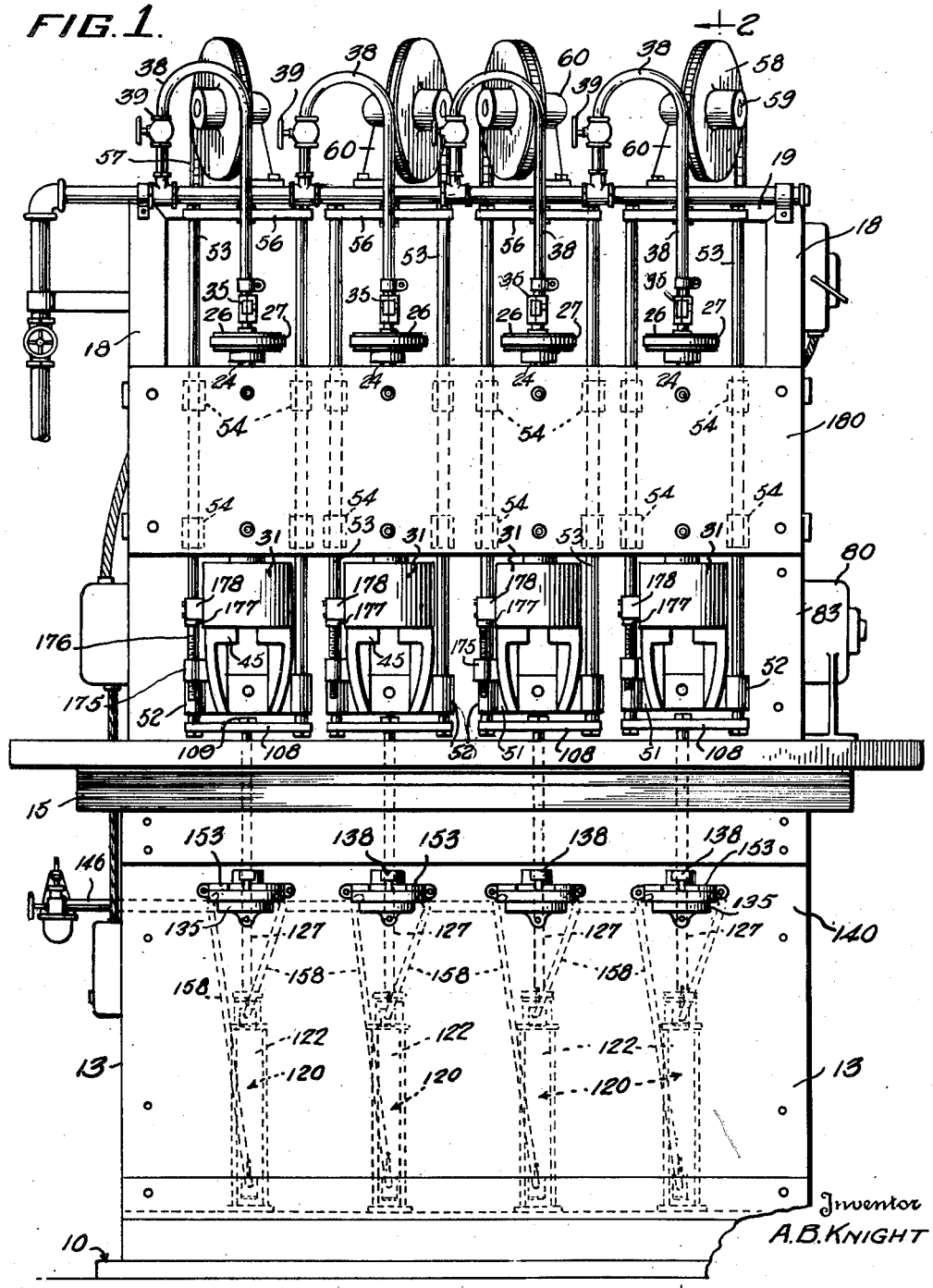

July 5, 1949. A. B. KNIGHT 2,475,100
GRINDING APPARATUS
Filed April 14, 1947 3 Sheets-Sheet 3

Inventor
A. B. KNIGHT
By C. L. Parker
Attorney

Patented July 5, 1949

2,475,100

UNITED STATES PATENT OFFICE 2,475,100

GRINDING APPARATUS

Albert B. Knight, Fairmont, W. Va.

Application April 14, 1947, Serial No. 741,339

12 Claims. (Cl. 51—125)

1

This invention relates to grinding apparatus, and more particularly to an apparatus for grinding the edges of glassware, and is an improvement over my prior Patent No. 2,185,344 granted January 2, 1940.

In the manufacture of glass articles such as tumblers, sherbets, etc., the glass, after being blown, is subjected to a cracking-off operation. This consists in etching a line approximately at what is to be the top edge of the glassware, and then subjecting the ware to the action of a burner which causes the ware to crack off around the etched line.

The ware, thus subjected to the cracking-off operation, will have sharp upper edges and will not necessarily be perfectly flat across the top. In the better grades of ware, it is the practice after the cracking-off operation to grind the upper edge of the ware to smooth and level the upper edge thereof, after which the ware is subjected to the action of a glazing burner which smooths the upper edge and softens it to give a perfectly smooth glazed edge.

In my prior patent referred to, there is disclosed an apparatus for grinding the edges of glassware after the cracking-off operation has been completed, and the apparatus referred to has been found highly satisfactory and practicable in commercial use. Among its advantages, such apparatus provides means for supporting glassware, including stemware, in its normal vertical position and the grinding is done from above by means of a rotating stone. The ware is supported in a suitable vertically movable chuck and water is fed downwardly through the hollow spindle which supports and rotates the stone so as to maintain the stone and the edge of the glass being ground in a wet condition at all times. The chuck is urged upwardly by the force of weights so that a predetermined pressure of the ware against the stone is maintained at all times during the grinding operation.

In the apparatus referred to, a treadle mechanism is employed for moving the chuck downwardly for the removal of the ware after the grinding operation has been completed. Another article is placed in the chuck and the operator releases the treadle whereby the weight connected to the chuck urges the latter upwardly to engage the ware with the stone. A skilled worker can judge fairly accurately a reasonable speed with which the chuck can be released for upward movement so as to avoid breaking the ware. However, even though the apparatus is highly practicable, carelessness and lack of skill on the part of the operator in releasing the chuck for upward movement results in an appreciable percentage of breakage of the ware.

An important object of the present invention is to provide an improved grinding apparatus of the type referred to above wherein the moving of the ware into engagement with the stone is removed from the judgment of the operator and the ware moves at a predetermined speed into engagement with the stone, thus preventing carelessness or lack of skill from breaking any of the ware.

A further object is to provide an apparatus of this character wherein fluid pressure means is employed for moving the ware vertically toward and away from the stone, and particularly downwardly away from the stone, and wherein upward movement of the ware is governed without the use of judgment on the part of the operator, thus substantially eliminating breakage of the ware.

A further object is to provide such a novel apparatus wherein a fluid pressure motor, preferably air operated, effects vertical movement of the chuck which carries the ware, and wherein the connection between the fluid pressure motor and the chuck is released when the ware engages the stone, thus transferring the upward pull on the chuck solely to the counterbalance weight, thus permitting the latter, wholly independently of the fluid pressure motor, to determine the pressure of the ware against the stone.

A further object is to provide a novel simple control means for the fluid pressure motor whereby the latter, which is of the double-acting type, may have either end thereof subjected to air or other fluid under pressure while the escape of fluid from the other end of the motor is adjustably restricted to limit the speed of movement of the motor piston and thus limit the speed of vertical movement of the chuck which carries the ware.

Other objects and advantages of the invention will become apparent during the course of the following description.

In the drawings I have shown one embodiment of the invention. In this showing

Figure 2:
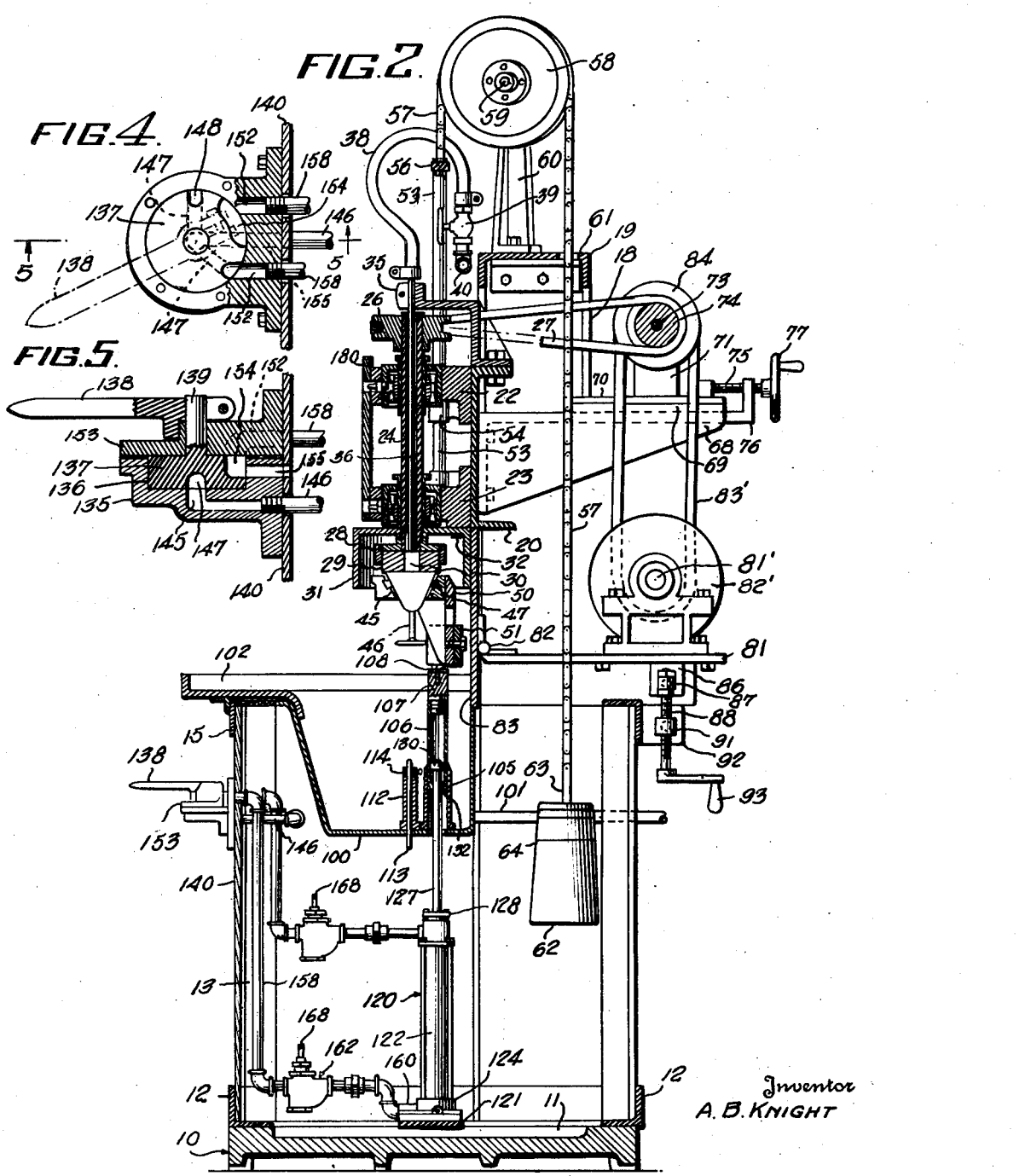
Figure 3:
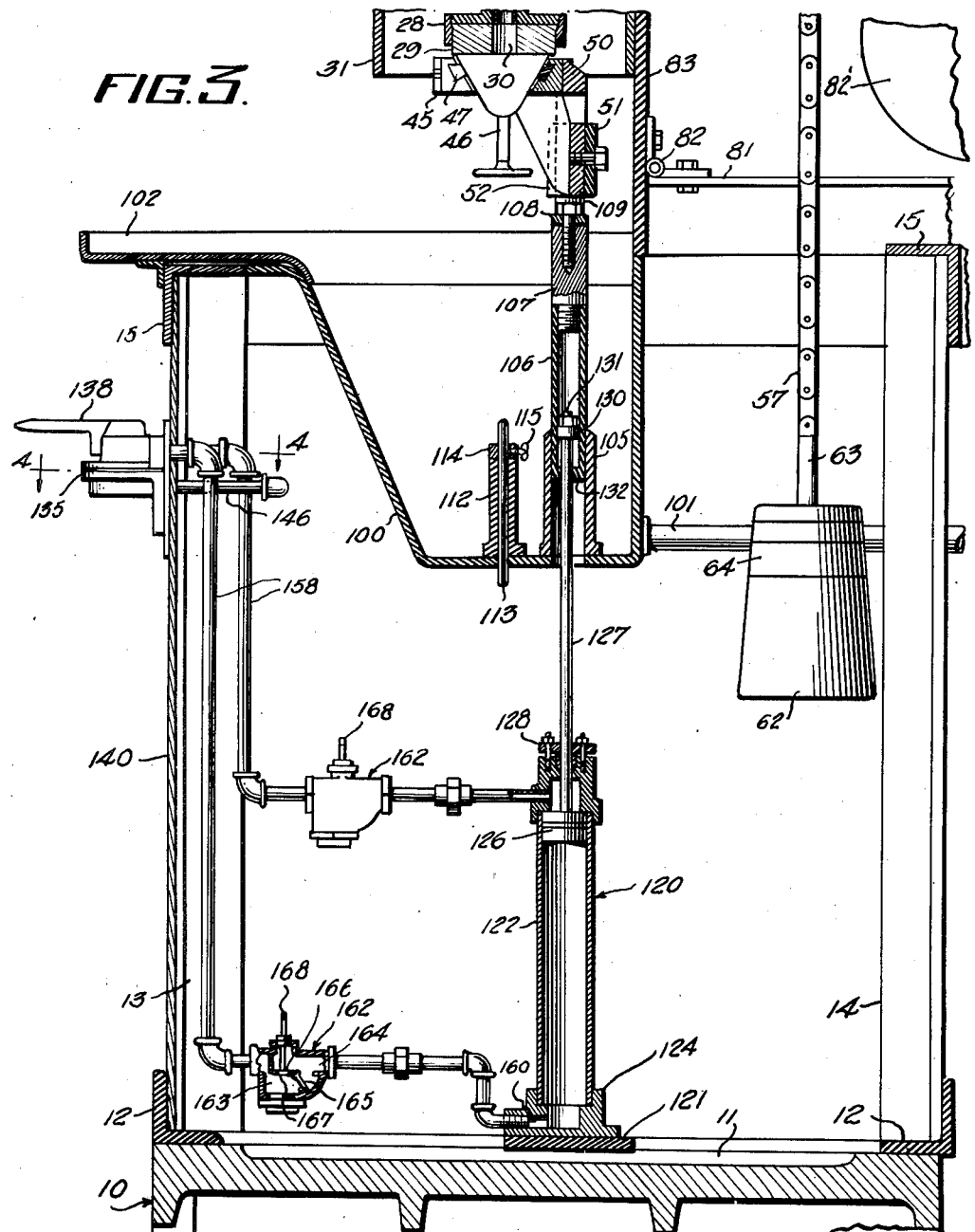

Figure 1 is a front elevation of the apparatus,

Figure 2 is a vertical sectional view taken substantially on line 2—2 of Figure 1, Figure 3 is an enlarged fragmentary vertical sectional view corresponding to the lower portion of Figure 2, Figure 4 is an enlarged horizontal sectional view on line 4—4 of Figure 3, parts being shown in elevation and parts being shown in broken lines, and Figure 5 is a vertical sectional view on line 5—5 of Figure 4.

Referring to Figures 1, 2 and 3, the numeral 10 designates a preferably relatively heavy rectangular cast iron base for the apparatus provided in its upper surface with a recess 11 which may collect any drippings of water finding their way to the bottom of the apparatus, as will become apparent. The top of the base 11 is surrounded by an angle iron frame 12, and this frame supports front and rear corner posts 13 and 14 respectively. At their upper ends, the posts 13 and 14 support an angle iron frame 15, horizontally arranged, as shown.

Adjacent each end of the apparatus, the frame 15 supports relatively heavy vertically extending channel members 18, the upper ends of which are connected by a similarly shaped cross member 19, these elements forming supports for elements of the apparatus to be described. Intermediate their heights, a relatively heavy channel-shaped cross member 20 extends between the uprights 18 and is secured at its ends thereto.

The cross member 20 supports a plurality of pairs of bearings 22 and 23 rotatably supporting hollow vertical spindles 24. Each of these spindles, above the upper bearing 22 thereof, carries a pulley 26 around which passes a drive belt 27 to be referred to later.

Adjacent its lower end, each spindle 24 carries a cup member 28 in which is secured a grinding stone 29 having an axial opening 30 therethrough for a purpose to be described. Each stone 29 is arranged within a housing 31. Each of these housings may be of the split type fully disclosed in my prior patent referred to, and each housing is fixed to the adjacent lower bearing 23 as at 32. These housings serve to protect the operator from contact with the high speed rotary stone 29 and its associated cup 28, and serve to prevent the throwing off of water fed to the bottom surface of the stone during the grinding operation.

A supporting bracket 35 is secured to the cross member 20 and overhangs each spindle 24. Each bracket 35 supports a depending small tube 36 which extends through the associated hollow spindle 24 to supply water through the opening 30 to the ware which is being ground by the stone 29 in a manner to be described. Each tube 36 is connected at its upper end to a flexible hose 38, and the other end of each hose communicates through a manually adjustable valve 39 with a water manifold 40 connected to any suitable source of water supply.

A chuck 45 is arranged below each spindle 24 in vertical alignment therewith and is shaped to receive the particular type of stemware to be ground. In the present instance, the chuck is shaped to receive the bowl of a sherbet or similar piece of stemware 46 and the inner face of the chuck is accordingly tapered in this particular case and is provided with a felt or other similar ring 47 to act as a cushion for the ware.

In accordance with the disclosure in my prior patent referred to, each chuck 45 is carried by a holder 50 secured to a crosshead 51 provided at opposite ends with cylindrical portions 52 fixed to vertical rods 53 to move therewith. These rods are vertically operative in guides 54 carried by each bearing 22 and 23 at opposite sides thereof.

The upper ends of the rods of each pair 53 are connected by a cross member 55 and centrally of its length, each such cross member is connected to one end of a chain 57. Each of these chains passes around a sprocket 58 mounted on a shaft 59 carried by the upper end of a bearing bracket 60 supported on the horizontal member 19 as clearly shown in Figure 2. Each chain 57, after passing around the associated sprocket 58, extends downwardly through an opening 61 in the member 19 and is provided at its lower end with a counterweight 62 connected thereto by a vertical stem 63. This stem is adapted to extend through supplemental counterweights 64, which may be added to the weight 62 if and when desired.

Rearwardly of each pair of bearings 22 and 23, the apparatus is provided with rearwardly extending supports 68 secured at their forward ends to the horizontal member 20. Each support 68 carries guides 69 in which is arranged the base 70 of a bearing 71. Such bearing carries a shaft 73, and the belt 27 passes around a pulley 74 carried by this shaft.

In my prior patent referred to, one of the shafts 73 is employed for each pair of grinding units. The particular drive means forms no part of the present invention and accordingly only one pulley 74 has been illustrated. The bearing 71 for the pulley 74 may be horizontally adjusted by a screw 75 threaded through a bracket 76 carried by the support 68 and carrying a hand wheel 77. Such means is provided for the purpose of adjusting the tension of each belt 27. It will be obvious that if individual shafts and pulleys 73 and 74 respectively are provided for each grinding unit, one of the adjusting means for the belts 74 will be provided for each such belt. If the pulleys 74 are arranged in pairs, one adjusting means will be employed for each pair.

In the present drawings, only one driving motor for the apparatus has been generally indicated and bears the reference numeral 80 in Figure 1. This motor is mounted on a support 81 hinged at its forward end as at 82 to a vertical wall 83 fixed at its end to the vertical members 18 (Figure 1). In my prior patent referred to, two of these motors and their associated hinged supports have been shown, but such detailed illustration is unnecessary in the present case, and it may be assumed that one motor 80 is employed for driving a single shaft 73 carrying a pulley 74 for each grinding unit.

The motor 80 has its shaft 81' provided with pulley elements 82' around and between which pass a belt 83', and this belt extends upwardly around and between pulleys 84 carried by the shaft 73. The pulleys 82' and 84 and belt 83' constitute a conventional Reeves unit for driving the shaft 73 and associated elements at variable desired speeds.

The transmission ratio between the pulleys 82' and 84 is determined by varying the distance between the axes of the shafts 73 and 81', and this is accomplished by swinging the support 81 about the axis of its hinge 82. A depending block 86 is carried by the support 81 and a swivel block 87 is connected to the block 86. A threaded shaft 88 extends through the block 87 and is fixed against axial movement relative thereto. The shaft 88 is threaded in a swivel block 91 carried by a bracket 92 secured to the adjacent frame member 15, and the lower end of the shaft 88 is provided with an operating handle 93.

A longitudinally extending relatively deep trough 100 is provided for catching water dropping downwardly from the grinding stone and the water is carried off from the trough through an overflow pipe 101 arranged relatively close to the bottom of the trough. A tray 102 extends along the front of the apparatus as shown in Figures 2 and 3 to catch any water which may splash too far forwardly to be directly caught by the trough 100.

The present invention is concerned primarily with a novel means for raising and lowering the ware into and out of contact with the stone 29. Referring to Figure 3, the numeral 105 designates a cylinder or sleeve fixed at its lower end to the bottom of the trough 100 and preferably welded or otherwise secured in position to provide a leak-proof joint. A cylinder 106 is reciprocable in the sleeve 105 and has a solid head 107 at its upper end secured to a cross member 108 as at 109.

Referring to Figure 1, it will be noted that the cross member 108 of each grinding unit is connected at its lower end to the lower ends of the associated rods 53. Accordingly each cylinder 106 is fixed with respect to the associated chuck 45 for vertical movement therewith.

The bottom of the trough 100 also carries an upstanding sleeve 112 welded or otherwise secured to the bottom of the trough to form a leak-proof connection therewith. A rod 113 is arranged in the sleeve 112 and is fixed against downward movement relative thereto in any adjusted position by means of a collar 114 provided with a set screw 115. The rod 113 is arranged in axial alignment with the chuck 45 and the ware 46 carried thereby, and the stem or rod 113 is adjusted vertically so as to contact with the bottom of the ware just before the latter reaches its lower limit of movement. The rod 113 thus serves as an ejector to lift the ware out of contact with the chuck to permit it to be readily manually removed.

An elastic fluid pressure motor indicated as a whole by the numeral 120 is supported at its lower end on a suitable horizontal support 121. The motor comprises a vertical cylinder 122 in axial alignment with the cylinder 106, and the cylinder 122 is connected to a base member 124 mounted on the support 121.

A piston 126 is reciprocable in the cylinder 122 and is provided with a vertically extending piston rod 127 operating in a suitable packing gland 128 carried by the upper end of the cylinder 122. The upper end of the piston rod 127 extends into the cylinder 106 and is provided with a collar or stop member 130 maintained in position by a nut 131. The lower end of the cylinder 106 extends inwardly as at 132 to form a shoulder with which the collar 130 is engageable during most of the vertical movement of the cylinder 106 as will be described below.

Means are provided for controlling fluid pressures in opposite ends of the cylinder 122 to vertically move the piston 126 and associated elements under the control of the operator. Referring to Figures 3, 4 and 5, the numeral 135 designates the body of a control valve having a recess 136 therein receiving a valve element 137 adapted to be oscillated in the recess 136 by means of a handle 138 carried by a stem 139 projecting upwardly from the valve 137. One of the valve mechanisms shown in Figures 4 and 5 is provided for the motor 120 of each grinding unit, and these valve mechanisms have the bodies 135 thereof fixed to a transverse plate 140 connected at opposite ends to the standards 13.

The valve body 135 is provided with a passage 145 to which is connected one end of a pipe 146 leading to a suitable source of elastic fluid pressure, compressed air preferably being employed as the fluid medium. The bottom of the valve 137 is provided with radially extending grooves 147, and each of these grooves is connected at its radially outer end with a vertical groove 148. The latter grooves are adapted to be selectively brought into communication with passages 152 formed in a valve cover 153 through which the valve stem 139 projects.

The valve 137 is provided with an arcuate cutout portion 154 forming a passage which is adapted to selectively communicate with the ports 152 and is in constant communication with a port 155 formed in the valve cover 153 and opening directly to the atmosphere as shown in Figure 5.

A pipe 158 is connected to each port 152 as shown in Figure 4. These pipes are connected to the respective ends of the associated cylinder 122 in the manner shown in Figure 3. One of the pipes 158 leads directly to the upper end of the cylinder, while the other pipe 158 communicates with the lower end of the cylinder 122 through a port 160 formed in the motor base 124. Each of the pipes 158 is provided with a control valve indicated as a whole by the numeral 162. Each of these valves is of a conventional type permitting unrestricted flow of fluid in one direction and restricted adjustable flow in the opposite direction. The interior structure of one of these valves is shown in Figure 3 and all of the valves 162 are identical with each other.

Referring to Figure 3, it will be noted that each valve 162 is formed with two chambers 163 and 164 and communication between these chambers is controlled by a check valve 165 and by a poppet valve 166. The check valve 165 closes away from the cylinder 122 and accordingly, in itself, prevents flow of fluid away from the cylinder 122 while permitting relatively free flow of fluid toward such cylinder. The poppet valve 166 is associated with a valve seat 167 and is operable by a stem 168 to adjust its position with respect to the seat 167. The primary purpose of each valve element 166 is to restrict the flow of fluid away from the associated end of the cylinder 122 and thus limit the speed of the piston 126 toward such end of the cylinder.

As further described below, the motor 120 and associated elements of each grinding unit limits the speed of movement of the ware 46 upwardly toward the stone 29 but releases the ware when it contacts with the stone to permit the associated weight 62 (Figure 2) to take over the control of the chuck 45 and thus predetermine the pressure of the ware against the stone. Each chuck is provided with a lug 175 (Figure 1) carrying a screw 176 provided at its upper end with a head 177. This head is engageable with a stop 178 carried by the associated shield 31 to limit upward movement of the chuck in the event the glass breaks, thus preventing grinding contact between the associated chuck and the adjacent stone 29.

The shield 31 of each grinding unit, as previously stated, protects the operator from possible contact with the stones 29 and prevents the flowing outwardly by centrifugal force of water fed to the ware at the grinding point. To further protect the operator from rotating parts, a shield plate 180 (Figures 1 and 2) preferably extends across the apparatus and is secured to the uprights 18.

Operation

The particular chuck 45 employed will be selected in accordance with the type of ware to be ground. Assuming that a chuck 45 is in its lowermost position, the operator will manually place the ware in position. The chucks are preferably split as fully disclosed in my prior patent referred to and as shown in Figure 3, thus permitting the ware to be placed in position by moving the stem 46 through the split in the chuck, and then moving the ware downwardly to the operative position. The chuck is so formed as to properly fit the body of the ware and center it with respect to the grinding axis and to position it in vertical alignment with such axis.

Assuming that the lower pipe 158, as viewed in Figure 4, leads to the bottom of the associated motor cylinder 122, the operator will move the handle 136 to the position shown in Figure 4, in which case the passage 145 from the pressure pipe 146 will communicate with such pipe 158 to admit pressure to the lower end of the cylinder 122. At the same time, the valve groove 154 will assume the position shown in Figure 4, connecting the pipe 158 of the top of the cylinder 122 to the port 155. Under such conditions, air under pressure will be admitted to the lower end of the cylinder 122, and the associated check valve 165 will open to permit the free flow of air to such end of the cylinder. The flow of air from the upper end of the cylinder will be restricted since the check valve of the other valve device 162 will be closed and air will bleed past the associated valve element 166 to be exhausted to the atmosphere through the associated pipe 158, port 152, passage 154 and port 155.

The restricted escape of air from the upper end of the cylinder 122 will prevent the piston 126 and the elements carried thereby from moving upwardly too rapidly. The speed of movement of these parts is governed by adjusting the valve stem 168 of the upper valve device 162, and the upward speed of the parts will be kept always below such speed as might result in breakage of the ware when contacting the grinding stone.

The force moving the chuck 45 and associated elements upwardly will be the sum of the differential pressures on opposite sides of the piston 126 and the force exerted by the associated weight 62. It is the differential pressures in the ends of the cylinder 122 that are governed by adjustment of the bleed valve 166 of the upper valve device 162. As will be apparent, therefore, any desired predetermined upward speed of the chuck and associated elements may be provided. The upper edge of the ware 46 thus is brought into contact with the stone 29 at a controlled safe speed so as to prevent breakage of the ware. The ware contacts with the stone ahead of the upper limit of movement of the piston 126 and accordingly this piston together with the rod 127 and collar or stop member 130 continue to move upwardly after the ware contacts with the stone.

It will be obvious, therefore, that the motor 120 releases its control over the chuck 45 and ware 46 as soon as the latter contacts with the stone 29, and thereafter, the pressure of the ware against the stone is determined by the weight 62. This member will be of such weight as to hold the ware against the stone under the desired grinding pressure.

The operation of the grinding mechanism per se is fully disclosed in my prior patent referred to. Briefly, the motor 80 (Figure 1) drives the shaft 81 and the Reeves unit comprising elements 82', 83' and 84 are adjusted to determine the rotational speed of the shaft 73. Each pulley 74 on such shaft drives the associated pulley 26 to rotate its spindle 24 and thus rotate the stone 29. Water is supplied constantly to the grinding point through the manifold 40, hose 38 and tube 36. The water drops downwardly into the trough 100 and flows therefrom through pipe 101. This pipe is substantially below the levels of the upper ends of the sleeves 105 and 112 (Figure 3) and accordingly substantially no water will flow downwardly around the cylinder 106 and rod 113. Any negligible leakage of water past such elements will be collected in the basin 11 of the base 10.

Upon completion of the grinding operation, the operator will swing the handle 136 (Figures 4 and 5) to the other operative position to connect the pipe 158 of the upper end of the cylinder 122 to the source of pressure and to exhaust air from the lower end of the cylinder through the associated pipe 158, port 155, groove 154 and exhaust port 155. Air pressure will then be freely supplied to the upper end of the cylinder 122 and air will bleed at a fixed leakage rate around the valve element 166 of the lower valve device 162. The valve element 166 for the bottom of the cylinder 122 may be opened slightly further than the corresponding valve element of the upper valve device 162 to permit more rapid downward movement of the piston 126. However, downward movement cannot take place too rapidly since it is highly desirable to employ the ejector rod 113 and accordingly the bottom of the ware cannot contact with such rod at too great a speed, otherwise breakage of the ware will occur.

From the foregoing it will be apparent that the present apparatus embodies all of the highly desirable and commercially successful features of my prior apparatus while eliminating the disadvantage thereof. The operator controls upward and downward movement of the ware into and out of contact with the grinding stone much more easily than with the prior apparatus since he is required merely to perform the simple operation of moving the valve handle 138. However, vertical movements of the ware are completely removed from control in accordance with the judgment of the operator, and thus breakage of the ware is substantially completely eliminated.

The apparatus provides for positive movement of the parts to engage the ware with the stone and to move it downwardly when the grinding operation is completed, and the speed of movement of the parts is predetermined and only the initial adjustment of the valve elements 166 is required. The weight 62 holds the shoulder 132 of each cylinder in engagement with its collar or stop member 130 during upward movement of the parts until the ware is engaged with the stone. Further upward movement of the ware and the parts connected thereto will then be arrested, but the piston 126 will continue to move the collar or stop member 130 upwardly to release it from the shoulder 132 and thus transfer the control of the ware to the weight 62 to provide the desired pressure of the ware against the stone. It has been found in operation that breakage of the ware is substantially completely eliminated regardless of the lack of skill of the operator or the degree of care which he exercises. At the same time, the production rate of the apparatus is increased. The reason for this is that skilled operators ordinarily will release the ware for upward movement at a speed substantially below the maximum safe speed to avoid breakage of the ware, whereas the present apparatus permits upward movement of the ware to take place at the maximum safe speed.

I claim:

1. An apparatus for effecting and controlling the movement of an article toward and from a work point, comprising an article holder, means biasing said article holder for movement toward said work point, a fluid pressure motor having a pressure movable member, valve mechanism for controlling the operation of said motor, and a mechanical connection between said pressure movable member and said article holder comprising a pair of relatively movable elements engageable for preventing movement of said article holder toward the work point independently of said pressure responsive member and for permitting movement of said pressure responsive member toward the work point independently of said article holder.

2. An apparatus for effecting and controlling the movement of an article toward and from a work point, comprising an article holder, means biasing said article holder for movement toward said work point, a fluid pressure motor having a pressure movable member, valve mechanism for controlling the operation of said motor, a connecting member fixed with respect to said article holder to move therewith and provided with a shoulder, and a stop member fixed with respect to said pressure responsive member but having movement relative to said connecting member in a direction away from the work point, said movement being limited by engagement of said stop member with said shoulder, said stop member being free for relative movement in the opposite direction.

3. An apparatus for effecting and controlling the movement of an article toward and from a work point, comprising an article holder, means biasing said article holder for movement toward said work point, a fluid pressure motor having a linearly movable pressure movable member, valve mechanism for controlling the operation of said motor, means for supporting said article holder for linear movement toward and away from the work point, a sleeve fixed to said article holder and arranged parallel to the line of movement thereof, said sleeve being provided with a shoulder, a rod connected to said pressure movable member, said rod being coaxial with said sleeve and slidably projecting thereinto, and a collar carried by said rod and engageable with said shoulder at the side thereof facing toward the article holder.

4. A grinding apparatus comprising a rotary grinding stone, an article holder adapted to support an article for movement into grinding engagement with said stone, means for guiding said article holder for linear movement toward and away from said stone, a sleeve fixed to said article holder and arranged parallel to the line of movement thereof, a double-acting fluid pressure motor having a pressure movable member therein and a rod connected thereto and projecting from the end of said motor toward said sleeve, means on said rod engageable with said sleeve to positively move said article holder away from the work, said rod being freely movable relative to the article holder in the opposite direction, and a manually operable valve mechanism for selectively connecting opposite ends of said motor to a source of pressure differential.

5. A grinding apparatus comprising a rotary grinding stone, an article holder adapted to support an article for movement into grinding engagement with said stone, means for guiding said article holder for linear movement toward and away from said stone, a sleeve fixed to said article holder and arranged parallel to the line of movement thereof, a double-acting fluid pressure motor having a pressure movable member therein and a rod connected thereto and projecting from the end of said motor toward said sleeve, means on said rod engageable with said sleeve to positively move said article holder away from the work, said rod being freely movable relative to the article holder in the opposite direction, a manually operable valve mechanism for selectively connecting opposite ends of said motor to a source of pressure differential, and a valve device for limiting the speed of movement of said pressure movable member in a direction toward said stone.

6. A grinding apparatus comprising a rotary grinding stone, an article holder adapted to support an article for movement into grinding engagement with said stone, means for guiding said article holder for linear movement toward and away from said stone, a sleeve fixed to said article holder and arranged parallel to the line of movement thereof, a double-acting fluid pressure motor having a pressure movable member therein and a rod connected thereto and projecting from the end of said motor toward said sleeve, means on said rod engageable with said sleeve to positively move said article holder away from the work, said rod being freely movable relative to the article holder in the opposite direction, a manually operable valve mechanism for selectively connecting opposite ends of said motor to a source of pressure differential, and a valve device between said valve mechanism and the end of said motor toward said stone for providing for the free flow of pressure fluid to such end of said motor, said valve device having a bleed valve for predetermining the rate of flow of fluid from said end of said motor for limiting the speed of movement of said pressure movable member toward said stone.

7. A grinding apparatus comprising a vertical rotary spindle, a grinding stone carried by the lower end of said spindle, an article holder mounted for vertical movement beneath said stone and adapted to support an article for movement into grinding engagement with said stone, means biasing said article holder upwardly to engage the article with the stone, a double-acting fluid pressure motor having a pressure responsive vertically movable member and a vertically extending rod connected thereto and projecting from said motor, a connecting member fixed to said article holder, a motion transmitting element connected to said rod and engageable with said connecting member to effect positive downward movement of said article holder, said rod being freely movable upwardly relative to said connecting member and having an upward limit of travel such that said element is released from said connecting member when the article engages said stone, and means for limiting the upward speed of travel of said pressure responsive member.

8. A grinding apparatus comprising a vertical rotary spindle, a grinding stone carried by the lower end of said spindle, an article holder mounted for vertical movement beneath said stone and adapted to support an article for movement into grinding engagement with said stone, means biasing said article holder upwardly to engage the article with the stone, a double-acting fluid pressure motor having a pressure responsive vertically movable member and a vertically extending rod connected thereto and projecting from said motor, a connecting member fixed to said article holder, a motion transmitting element connected to said rod and engageable with said connecting member to effect positive downward movement of said article holder, said rod being freely movable upwardly relative to said connecting member and having an upward limit of travel such that said element is released from said connecting member when the article engages said stone, conduits connected to the respective ends of said motor, a manual valve mechanism for selectively connecting either conduit to a source of pressure differential and for connecting the other conduit to the atmosphere, a check valve in the conduit to the upper end of said motor providing for the free flow of pressure fluid thereto, and a bleed valve in said last named conduit operable independently of the associated check valve for limiting the speed of escape of the pressure fluid from the associated end of said motor.

9. A grinding apparatus comprising a vertical rotary spindle, a grinding stone carried by the lower end of said spindle, an article-holding chuck arranged beneath said stone and adapted to support an article for movement into grinding engagement with said stone, means for supporting said chuck for vertical movement, a vertical sleeve carried by and depending from said chuck, a fluid pressure motor comprising a vertical cylinder in axial alignment with said sleeve, a piston reciprocable in said cylinder, and an upwardly extending piston rod carried by said piston and extending slidably into said sleeve, an element carried by said piston rod and engageable with a portion of said sleeve for positively moving the latter downwardly, said element being freely movable upwardly relative to said sleeve, a weight biasing said element and said chuck for upward movement to engage the article with said stone, said weight holding said element in engagement with said portion of said sleeve during upward movement of the latter until the article is engaged with said stone, and said element being adapted to partake of further upward movement to release it from said portion of said sleeve whereby said weight determines the pressure of engagement of the article with said stone, and a manual valve mechanism for selectively connecting opposite ends of said cylinder to a source of pressure fluid.

10. A grinding apparatus comprising a vertical rotary spindle, a grinding stone carried by the lower end of said spindle, an article-holding chuck arranged beneath said stone and adapted to support an article for movement into grinding engagement with said stone, means for supporting said chuck for vertical movement, a vertical sleeve carried by and depending from said chuck, a fluid pressure motor comprising a vertical cylinder in axial alignment with said sleeve, a piston reciprocable in said cylinder, and an upwardly extending piston rod carried by said piston and extending slidably into said sleeve, an element carried by said piston rod and engageable with a portion of said sleeve for positively moving the latter downwardly, said element being freely movable upwardly relative to said sleeve, a weight biasing said element and said chuck for upward movement to engage the article with said stone, said weight holding said element in engagement with said portion of said sleeve during upward movement of the latter until the article is engaged with said stone, and said element being adapted to partake of further upward movement to release it from said portion of said sleeve whereby said weight determines the pressure of engagement of the article with said stone, conduits connected to the respective ends of said cylinder, a manual valve mechanism for connecting either conduit to a source of pressure fluid and for connecting the other conduit to the atmosphere, a check valve in the conduit to the upper end of said cylinder providing for the free flow of pressure fluid thereto, and a bleed valve in said conduit operable independently of the associated check valve for limiting the upward speed of movement of said piston.

11. A grinding apparatus comprising a vertical rotary spindle, a grinding stone carried by the lower end of said spindle, an article support having an article holder projecting laterally therefrom and arranged beneath said stone in axial alignment therewith, said holder being shaped to support an article therein for movement into engagement with said grinding stone, means for guiding said support for vertical movement, an ejector rod arranged beneath said article holder and engageable with an article therein when said holder moves downwardly to eject the article from said holder, a double-acting fluid pressure motor having a piston and a piston rod connected thereto projecting from the upper end of said motor, a connecting member fixed to said support and having an upwardly facing shoulder, an element carried by said piston rod and engageable with said shoulder for positively moving said support and said article holder downwardly, said piston rod being freely movable upwardly relative to said connecting member, means biasing said support and said article holder upwardly to maintain said shoulder in engagement with said element during upward movement of said piston rod until the article contacts with said grinding stone, said piston rod thereafter moving to an upper limit fully releasing said element from said shoulder, a conduit connected to each end of said motor, and a manual valve mechanism for selectively connecting either conduit to a source of pressure differential and for connecting the other conduit to the atmosphere.

12. Apparatus constructed in accordance with claim 11 wherein each conduit is provided with a check valve providing for the free flow of pressure fluid to the ends of said motor, each conduit having a bleed valve operable independently of the associated check valve for restricting the flow of fluid from the associated end of said motor.

ALBERT B. KNIGHT.

REFERENCES CITED

The following references are of record in the file of this patent:

UNITED STATES PATENTS

| Number | Name | Date |
|---|---|---|
| 737,811 | Altenbaugh | Sept. 1, 1903 |
| 803,304 | Muncaster et al. | Oct. 31, 1905 |
| 1,327,830 | Knight | Jan. 13, 1920 |
| 1,607,292 | Miller | Nov. 16, 1926 |
| 1,987,222 | Ward | Jan. 8, 1935 |
| 2,185,344 | Knight | Jan. 2, 1940 |